(12) United States Patent
Goss et al.

(10) Patent No.: US 11,687,292 B2
(45) Date of Patent: Jun. 27, 2023

(54) DATA UPDATE MANAGEMENT IN A CLOUD COMPUTING ENVIRONMENT

(71) Applicant: Seagate Technology LLC, Cupertino, CA (US)

(72) Inventors: Ryan James Goss, Prior Lake, MN (US); David Scott Ebsen, Minnetonka, MN (US); Mark Allen Gaertner, Vadnais Heights, MN (US); Michael Joseph Steiner, Saint Paul, MN (US); Antoine Khoueir, Apple Valley, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 455 days.

(21) Appl. No.: 13/777,810

(22) Filed: Feb. 26, 2013

(65) Prior Publication Data

US 2014/0244896 A1 Aug. 28, 2014

(51) Int. Cl.
*G06F 3/06* (2006.01)

(52) U.S. Cl.
CPC ............ *G06F 3/067* (2013.01); *G06F 3/0611* (2013.01); *G06F 3/0619* (2013.01); *G06F 3/0649* (2013.01); *G06F 3/0685* (2013.01)

(58) Field of Classification Search
CPC .................... G06F 2212/7211; G06F 3/067
See application file for complete search history.

(56) References Cited

U.S. PATENT DOCUMENTS

| 7,017,078 | B2 | 3/2006 | Frimout |
| 7,904,604 | B2 | 3/2011 | Lum et al. |
| 7,911,840 | B2 | 3/2011 | Wu et al. |
| 2007/0250601 | A1* | 10/2007 | Amlekar ............ G06F 16/9574 709/219 |
| 2007/0288589 | A1* | 12/2007 | Chen et al. .................. 709/217 |
| 2010/0332401 | A1* | 12/2010 | Prahlad ............... G06F 17/3002 705/80 |
| 2011/0087842 | A1 | 4/2011 | Lu et al. |
| 2011/0271067 | A1 | 11/2011 | Chou et al. |

(Continued)

FOREIGN PATENT DOCUMENTS

| CN | 102265267 A | 11/2011 |
| CN | 102301345 A | 12/2011 |
| CN | 102810068 A | 12/2012 |

OTHER PUBLICATIONS

Rouse, Margaret; "What is tiered storage?"; <https://searchstorage.techtarget.com/definition/tiered-storage>; pp. 1-4. (Year: 2019).*

*Primary Examiner* — Arpan P. Savia
*Assistant Examiner* — Eric T Loonan
(74) *Attorney, Agent, or Firm* — Hall Estill Law Firm; Randall K. McCarthy

(57) ABSTRACT

Method and apparatus for managing data in a cloud computing environment. In accordance with some embodiments, data updates are received to a multi-tier memory structure across a cloud network and stored as working data in an upper rewritable non-volatile memory tier of the memory structure. The working data are periodically logged to a lower non-volatile memory tier in the memory structure while a current version of the working data remain in the upper memory tier. The upper and lower memory tiers each are formed of rewritable memory cells having different constructions and storage attributes.

18 Claims, 5 Drawing Sheets

(56) References Cited

U.S. PATENT DOCUMENTS

| | | | |
|---|---|---|---|
| 2012/0089781 A1* | 4/2012 | Ranade et al. | 711/118 |
| 2012/0110394 A1 | 5/2012 | Murakami et al. | |
| 2012/0311144 A1 | 12/2012 | Akelbein et al. | |
| 2012/0311237 A1* | 12/2012 | Park | 711/103 |
| 2012/0323597 A1* | 12/2012 | Woolford | 705/2 |
| 2012/0331091 A1 | 12/2012 | Tseng | |
| 2013/0212207 A1* | 8/2013 | Ong | 709/213 |
| 2014/0050026 A1* | 2/2014 | Li | G06F 12/0246 365/185.11 |

\* cited by examiner

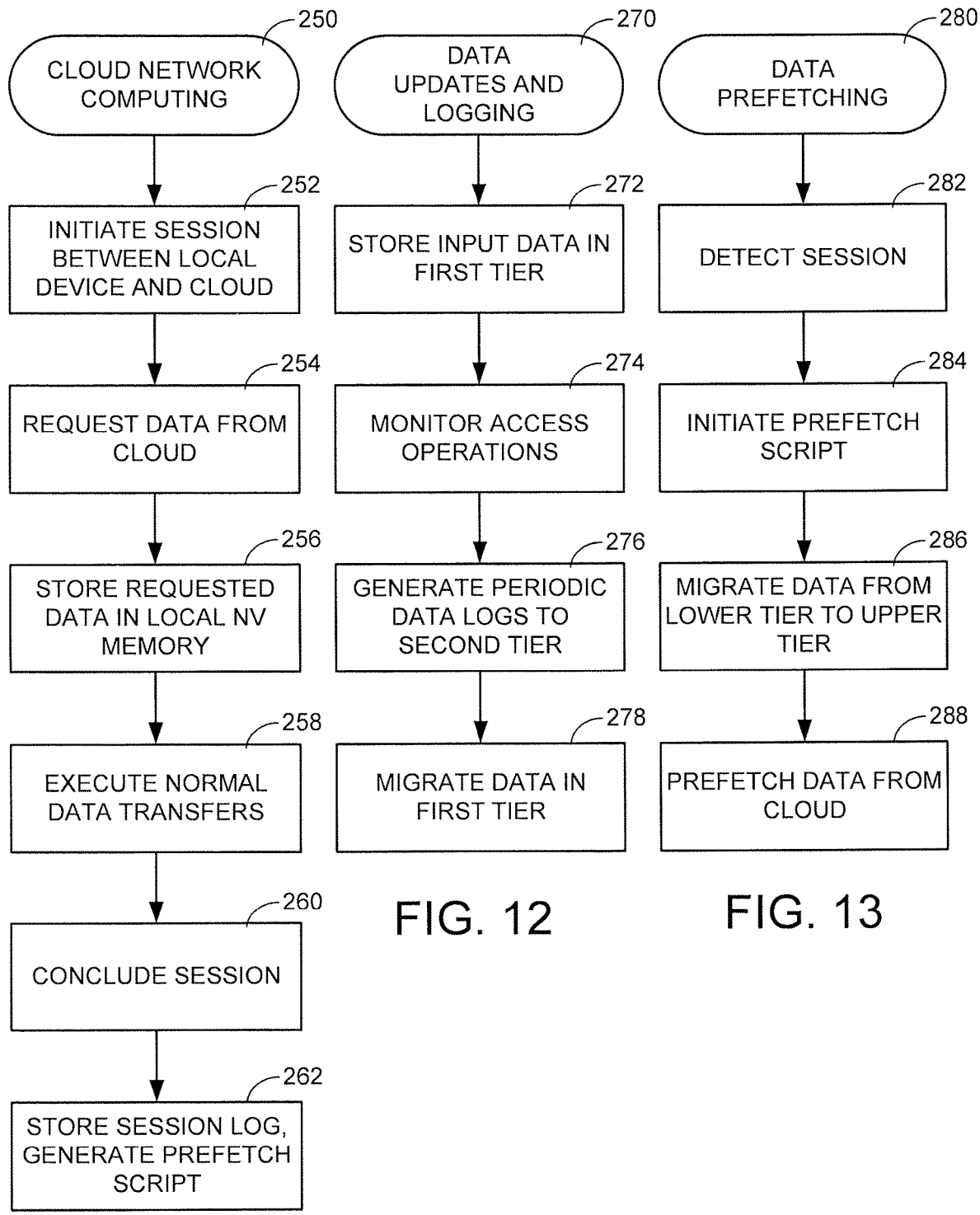

DATA UPDATE MANAGEMENT IN A CLOUD COMPUTING ENVIRONMENT

SUMMARY

Various embodiments of the present disclosure are generally directed to managing data in a cloud computing environment.

In accordance with some embodiments, data updates are received to a multi-tier memory structure across a cloud network and stored as working data in an upper rewritable non-volatile memory tier of the memory structure. The working data are periodically logged to a lower non-volatile memory tier in the memory structure while a current version of the working data remain in the upper memory tier. The upper and lower memory tiers each comprise rewritable memory cells having different constructions and storage attributes.

These and other features and aspects which characterize various embodiments of the present disclosure can be understood in view of the following detailed discussion and the accompanying drawings.

BRIEF DESCRIPTION OF THE DRAWINGS

FIG. 11 is a flow chart for a CLOUD NETWORK COMPUTING routine carried out in accordance with some embodiments.

FIG. 12 provides a DATA UPDATES AND LOGGING routine executable in conjunction with the routine of FIG. 11.

FIG. 13 shows a DATA PREFETCHING routine executable in conjunction with the routine of FIG. 11.

DETAILED DESCRIPTION

Figure 1:
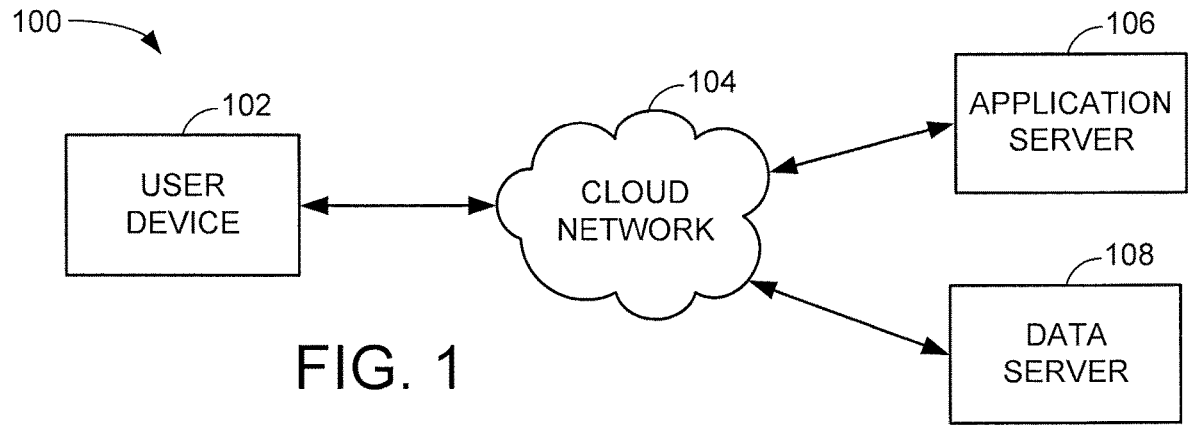
FIG. 1 provides is a functional block representation of a cloud computing system in accordance with various embodiments of the present disclosure.

The present disclosure generally relates to the management of data in a cloud computing environment.

Cloud computing systems deliver computer-based hardware and/or software resources from a remote location to a local user via a network. This allows the resources to be operated and managed remotely rather than locally on a local device. Often, the resources are made available to a large number of local users through a subscription service, providing economies of scale in a manner reminiscent of more conventional "utility" companies (e.g., gas, electricity, phone service, etc.).

The local user device may take the form of a terminal, tablet, smart phone, laptop, smart card, e-reader or other communication device. The device has relatively limited memory and computation capabilities compared to what can be made selectively available to the device over the cloud network. During a cloud computing session, the local user device can be granted access to applications, operating systems, data sets, computation engines, and/or other resources which are accessed by the local device on an as requested basis. In some cases, some or all of the user data are stored remotely "in the cloud" rather than locally on the device.

Cloud computing applications have become increasingly popular in recent years. Examples include games, e-books, business software, email systems, movies, virtual desktop systems, hypervisor systems, web based applications and databases, operating systems, and other types of network-based, computational environments.

While operable in providing a user with a wide variety of potential resources, cloud computing networks can sometimes provide relatively slow data transfer rates and extended loading times. This can present bottlenecks at the user device level, particularly in applications that are more interaction-based rather than streaming-based. Interaction-based applications generally involve random I/O exchanges between the local user device and the remote cloud resource (s), such as in certain types of database type applications. Streaming-based applications tend to be more one-way, as content is streamed (sequentially presented) to the device as needed such as in the case of movie presentations, e-books, etc.

Regardless of the type of cloud based application, there remains a continual need for improvements in the manner in which data are managed in a cloud computing environment. As explained below, various embodiments are generally directed to the use of a memory module at a local node of a multi-node cloud computing network system. The memory module has a multi-tiered non-volatile memory structure with different tiers of memory adapted to manage different types of memory during a cloud computing session.

In some embodiments, current data are maintained in a higher tier, and update logs of the current data are periodically transferred to a lower tier. The current data may be migrated to different locations within the higher tier. Session logs of an entire session may be maintained in a lower tier. Data patterns may be analyzed and data may be speculatively prefetched from a different node in the cloud network and/or a lower tier of memory during a subsequent session.

These and other features of various embodiments can be understood beginning with a review of FIG. 1 which provides a functional block representation of a cloud computing system 100. The system 100 includes a local user device 102 connected to a cloud network 104. The cloud network can take any of a number of forms, including a local area network, a wide area network, a broadband network, the Internet, etc. The interconnection between the user device 102 and the network 104 can be any suitable form including wireless, Ethernet, fibre channel, blue tooth, etc. It will be appreciated that the device 102 forms a selected local node of the overall system 100.

Additional devices connected to the network 104 include a remote application server 106 and a remote data server 108. Any variety of additional devices can be connected at various nodes for communications with the local device 102, as well as any number of additional local devices. The servers 106, 108 supply resources for use by the user of the local device 102. The user is granted access to the cloud network via one or more accounts that are uniquely tailored to the configuration of the user device 100. Ideally, only the user (by way of authorized access through the device 102) has access to the user's data stored remotely in the data server 108.

For purposes of illustration, the application server 106 is contemplated as comprising one or more communication devices with associated processing capabilities and memory to supply software application and computation resources to the local user device 102. The data server 108 comprises one or more communication devices with associated processing capabilities and memory to supply data storage and retrieval resources to the local user device 102. The application and data resources are requested by the user device for execution, storage, viewing and/or other processing at the user device level.

Figure 2:
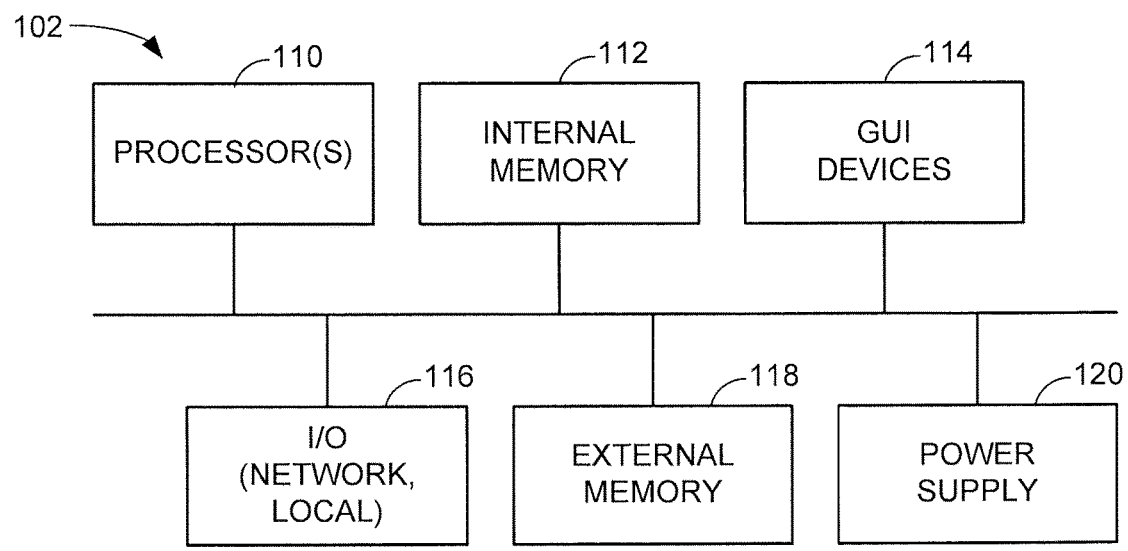
FIG. 2 illustrates an exemplary arrangement for a user device of FIG. 1.

FIG. 2 illustrates the user device 102 of FIG. 1 in accordance with some embodiments. It will be appreciated that the user device 102 can take any number of suitable forms such as but not limited to a tablet, personal computer, laptop, e-reader, personal data assistant, smart phone, terminal, smart card, workstation or other desktop or portable communication device. In some cases, the device 102 includes an existing dumb terminal to which is presented a portable storage device from the user with information sufficient to identify the user and gain access to the user's account(s).

The example user device 102 includes one or more programmable processors 110, internal memory 112, graphical user interface (GUI) 114, data input/output (I/O) circuits 116, external memory 118 and power supply module(s) 120. Other configurations can readily be used, including the use of additional modules and/or the omission of one or more of the listed modules.

The processors 110 provide top level control of the device 102. The internal memory 112 stores programming instructions and/or data used by the processors and other modules. The GUI 114 may include a video screen, touch screen, user selectable buttons, keyboard, mouse, speakers and/or other modules to allow a human user of the system to interact with resources supplied to the device 100 via the network 104.

The I/O circuits 116 include communication capabilities to communicate with the network 104 as well as local communication between modules. When used, the external memory 118 may function as a main memory or an auxiliary memory for use by the system, and therefore may be internal or external and permanently affixed or selectively coupled to the device. The power supply 120 supplies electrical power for use by the device 102.

Figure 3:
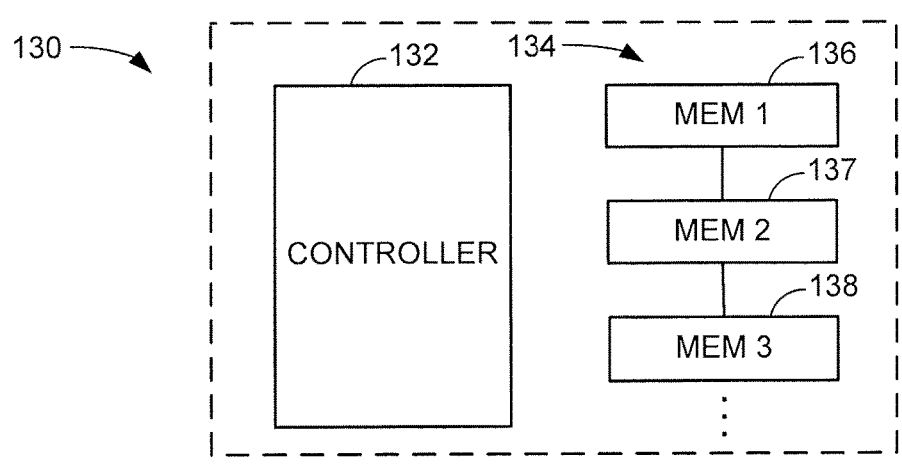
FIG. 3 provides a functional block representation of a storage memory of the user device of FIG. 2.

FIG. 3 depicts a memory module 130 of the user device 102. The memory module 130 may form the internal memory 112, the external memory 118, or some other aspect of the user device (including the entirety of the device).

The memory module 130 includes a memory controller 132 and a multi-tiered memory structure 134. The controller 132 provides top level control of the memory module 130, and the memory structure 134 stores and retrieves user data from/to a requestor entity, such as the processors 110 or other entities including the remote servers 106, 108.

The memory structure 134 includes a number of non-volatile memory tiers 136, 137 and 138 denoted as MEM 1-3. The number and types of memory in the various tiers can vary as desired. Generally, the higher tiers in the memory structure 134 may be constructed of smaller and/or faster memory and the lower tiers in the memory structure may be constructed of larger and/or slower memory. The tiers may be arranged in a priority order so that higher priority data are stored to relatively higher tier levels in the structure.

For purposes of providing one concrete example, the memory structure 134 is contemplated as a flash memory-based storage device, such as a solid state drive (SSD), a portable thumb drive, a memory stick, a memory card, a hybrid storage device, etc. so that at least one of the lower memory tiers provides a main store that utilizes erasable flash memory. At least one of the higher memory tiers provides rewriteable non-volatile memory such as resistive random access memory (RRAM), phase change random access memory (PCRAM), spin-torque transfer random access memory (STRAM), etc. This is merely illustrative and not limiting. Other levels may be incorporated into the memory structure, such as volatile or non-volatile cache levels, buffers, etc.

As used herein, non-volatile will refer to the capability of a memory to retain stored data in the absence of applied power. Erasable memory, such as flash memory, will refer to memory that requires a specially configured erasure operation to memory cells of the memory before new, updated data can be written to the memory cells. Rewritable memory, such as RRAM, PCRAM, STRAM, etc., will refer to memory that can accept any other available memory programmed state regardless of an initial programmed state of the memory cells. Hence, unlike erasable memories, rewritable memories can receive new, updated data directly overwritten onto existing data.

Figure 4:
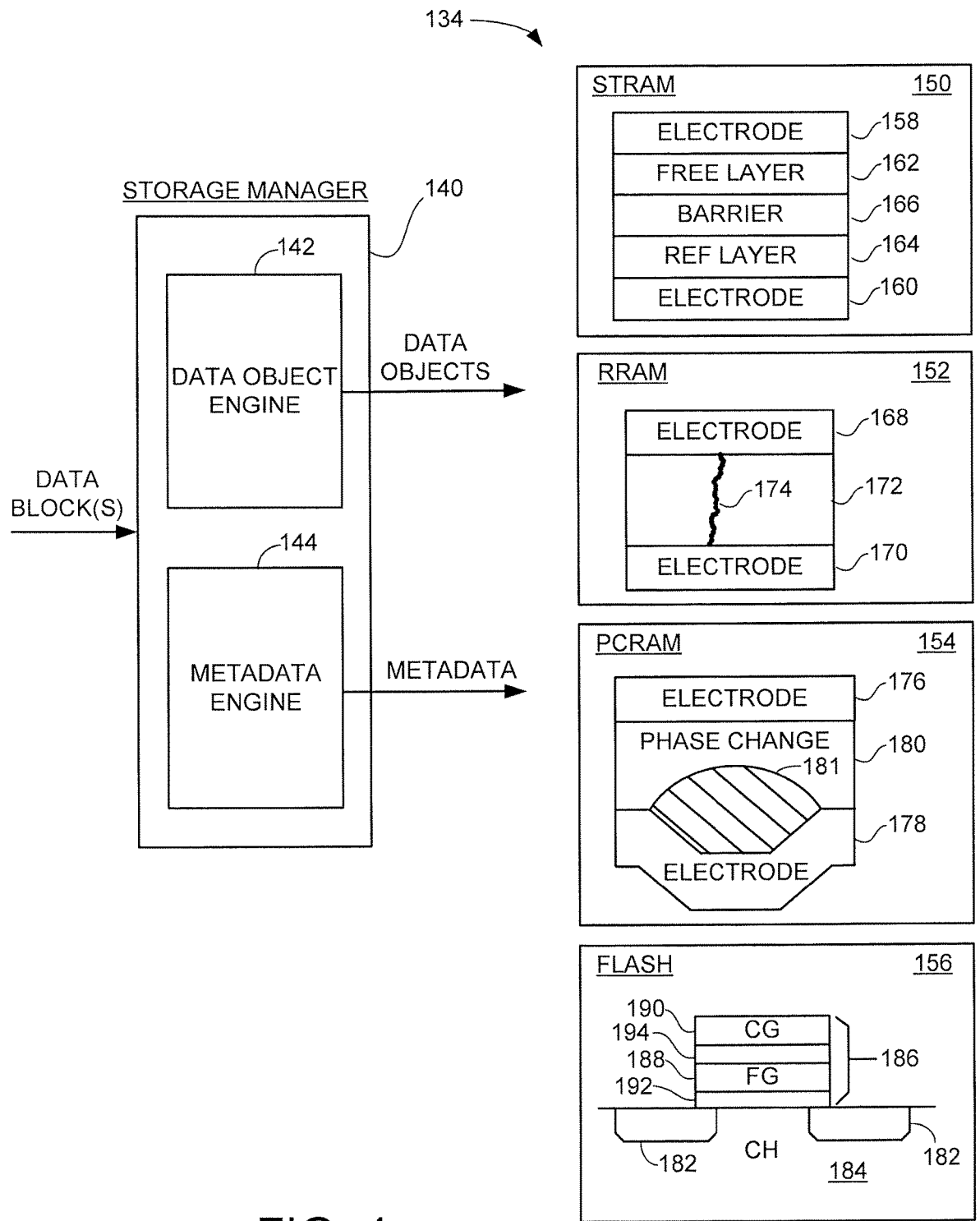
FIG. 4 depicts a storage manager and respective tiers of a multi-tier non-volatile memory structure in accordance with some embodiments.

FIG. 4 shows aspects of the memory module 130 of FIG. 3 in accordance with some embodiments. It will be appreciated that the various types of rewritable and erasable memories in FIG. 4 are merely exemplary and are not limiting, as any number of other types of memories and numbers of tiers of memory can be utilized as desired, including carbon nanotube based memories, magnetic random access memory (MRAM), disc based memories (including magnetic and optical), etc.

A storage manager 140 may be incorporated as a portion of the controller functionality, or can be realized as part of the memory structure. The storage manager 140 includes a data object engine 142 that generates data objects and a metadata engine 144 that generates metadata for the data objects. Both the data objects and the metadata are stored to various tiers in the memory structure 134.

As used herein, data objects refer to addressable sets of data blocks received from a requestor, such as data sectors of fixed size (e.g., 512 bytes, etc.). The data blocks may be provided with a logical address (such as a logical block address, LBA) to identify the blocks at the requestor level. Each data object may include one or more LBAs, and the grouping of LBAs in a given data object may be selected based on data attributes and or memory tier storage attributes. For example, data objects having a page's worth of data (e.g., 8192 bytes, etc.) may be stored in a flash memory level whereas data objects having individual LBAs may be stored at a higher RRAM level.

The metadata provide control information to allow the memory module to track the location and status of the various data objects. Both the data objects and the metadata can take a variety of formats. Other processing can be applied to the data including error correction codes (ECC), encryption, etc.

The memory structure 104 in FIG. 4 is shown to encompass four tiers 150, 152, 154 and 156. Other formats, numbers and ordering of tiers can be used. The first tier 150 is shown to comprise spin-torque transfer random access memory (STRAM) memory cells, which are rewritable non-volatile memory cells each adapted to store data as a programmable electrical resistance. The exemplary STRAM cell includes upper and lower conductive electrodes 158, 160 which bound a magnetic tunneling junction (MTJ) formed of a free layer 162, reference layer 164 and intervening tunneling barrier layer 166. Other MTJ configurations can be used.

The free layer 162 comprises one or more layers of magnetically responsive material with a variable magnetic orientation. The reference layer 164 comprises one or more layers of magnetically responsive material with a fixed magnetic orientation. The reference layer may include a pinning layer, such as a permanent magnet, a synthetic antiferromagnetic (SAF) layer, etc., and a pinned layer, such as a ferromagnetic layer oriented magnetically by the pinning layer. The direction(s) of the magnetic orientation may be perpendicular or parallel to the direction of current through the MTJ.

The MTJ exhibits different electrical resistances in relation to the orientation of the free layer 162 relative to the reference layer 164. A relatively low resistance is provided in a parallel orientation, where the free layer is oriented in the same direction as the reference layer. A relatively high resistance is provided in an anti-parallel orientation, where the free layer is oriented in the opposing direction as the reference layer. Spin torque currents can be applied to transition the free layer between the parallel and anti-parallel orientations.

The second tier 152 comprises a non-volatile rewritable resistive random access memory (RRAM). Each RRAM cell comprises top and bottom conductive electrodes 168, 170 separated by an intervening layer such as an oxide layer or electrolytic layer. The intervening layer 172 normally has a relatively high electrical resistance.

During a programming operation, ionic migration is initiated which may result in the formation of a conductive filament 174 that lowers the electrical resistance through the RRAM element 172. Other RRAM configurations are contemplated that do not necessarily form a conductive filament, such as structures that undergo a change of state by the migration of ions or holes across a barrier or to an intermediate structure that results in a controlled change in resistance for the element.

The third tier 154 in the memory structure 104 in FIG. 4 comprises a non-volatile, rewritable phase change random access memory (PCRAM). Each PCRAM cell has top and bottom conductive electrodes 176, 178 separated a phase change material 180. The phase change material is heat responsive and transitions (melts) when heated to a temperature at or above its glass transition temperature. Depending on the rate at which the layer 180 is subsequently cooled, at least a portion of the material can take an amorphous or crystalline state, with respective higher and lower resistances. FIG. 4 shows an amorphous zone 181 indicating the cell is programmed to a high resistance state.

The fourth tier 156 is a flash memory tier made up of non-volatile, erasable flash memory cells. Doped regions 182 in a semiconductor substrate 184 form source and drain regions spanned by a gate structure 186. The gate structure includes a floating gate (FG) 188 and a control gate (CG) 190 separated by intervening barrier layers 192, 194. Data are stored to the cell in relation to the accumulation of electrical charge on the floating gate 188.

The flash memory cells are written (programmed) by applying suitable voltages to migrate charge from the channel to the respective floating gates 188. The presence of charge on the floating gate 188 of a cell increases the threshold voltage that needs to be placed on the control gate 190 to place the cell in a drain-source conductive state. The programmed states are read (sensed) by applying a succession of voltages to the respective drain, source and gate terminals to detect the threshold at which the cells are transitioned to a conductive state along the drain source path (across the channel CH). A special erasure operation is required to remove the accumulated charge and return the cell to an unerased, initialized state.

The flash memory cells may be arranged as single level cells (SLCs) or multi-level cells (MLCs). SLCs store a single bit and MLCs store multiple bits. Generally, each cell can store up to N bits of data by providing $2^N$ distinct accumulated charge levels. At least some of the various rewritable memory constructions of tiers 150, 152 and 154 can also be configured as SLCs or MLCs, depending on the construction and operation of the cells.

It is contemplated that each tier will have its own associated memory storage attributes (e.g., capacity, data unit size, I/O data transfer rates, endurance, etc.). The highest order tier will tend to have the fastest I/O data transfer rate performance (or other suitable performance metric) and the lowest order tier will tend to have the slowest performance. Each of the remaining tiers will have intermediate performance characteristics in a roughly sequential fashion in a priority order.

Figure 5:
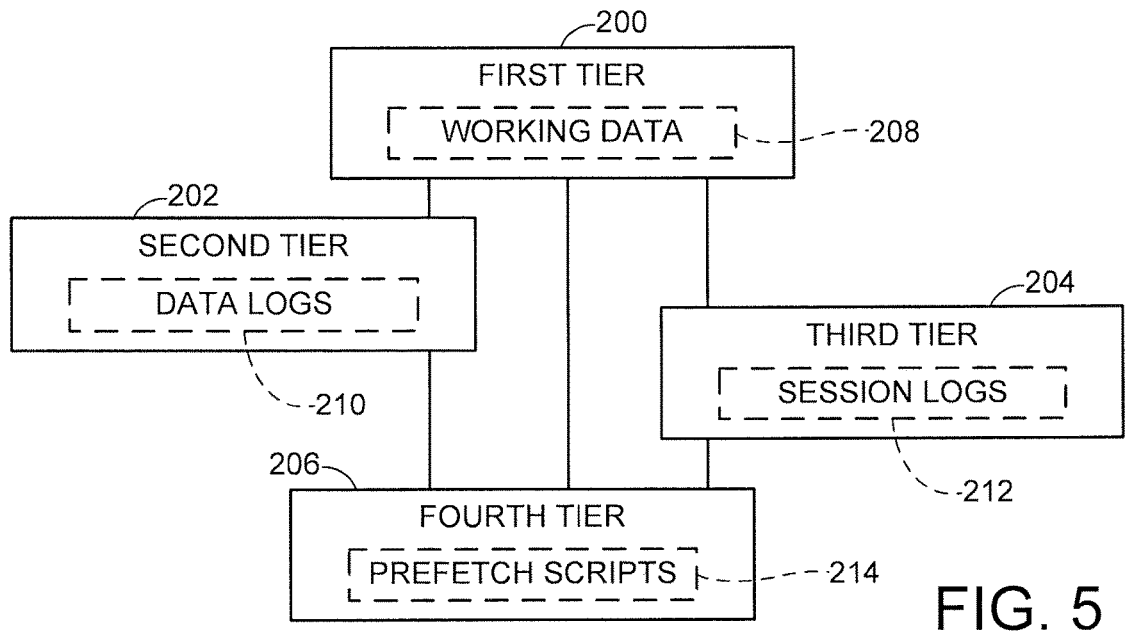
FIG. 5 illustrates an interplay between various types of data that can be stored to various tiers in accordance with some embodiments.

FIG. 5 shows four respective memory tiers 200, 202, 204 and 206 which may be incorporated into the memory structure 104. The first tier 200 will be understood to have a higher priority ordering than the remaining tiers, and may be provided with faster I/O performance or other characteristics that make the first tier a primary storage location for high priority data. Thus, the first tier 200 may or may not be the absolutely highest tier in the memory structure, but it will be relatively higher in priority ordering than the remaining tiers 202, 204 and 206.

Different types of data sets are stored to the respective tiers. Working data 208 are stored to the first tier 200; data logs 210 are stored to the second tier 202; session logs 212 are stored to the third tier 204; and prefetch scripts and data 214 are stored to the fourth tier 206. It will be appreciated that other orderings and locations of the respective data sets can be utilized as required, including the storage of two or more of the various lower data sets 210, 212 and 214 to the same lower tier 202, 204, 206. The data sets depicted in FIG. 5 are contemplated as data objects; corresponding metadata will be stored in the various tiers, or in other tiers, to enable the system to correctly locate and manage the various types of data sets.

Generally, the working data 208 represents the current version data that have been loaded to the memory module 130 during a cloud computing session. For example, in the case of a streamed application such as an e-book or a movie, the working data may represent data that are successively displayed on the GUI 114 (FIG. 2) for the user. In an interactive application, the working data may represent programs and/or data sets that are accessed by the user during the cloud computing session. The rate at which the working data is updated will depend on the application and user directed inputs supplied thereto.

The data logs 210 represent periodic copies of the current data 208 which are transferred to the second tier 202 at suitable times. The data logs 210 may be contemplated as "snapshots" of the current data at a particular point in time. Depending on the memory capabilities, all of the working data 208 in the first tier 200 may be captured in the data logs 210 over a given session. Alternatively, the oldest data logs will be jettisoned from the second tier so that the data logs represent the last X snapshots in succession.

The data logs 210 can facilitate improved user enjoyment and interaction with the associated cloud based application by maintaining a log of updates that have been recently enacted by the user. For example, in the event of a temporary loss of power to the device 102, both the current version of the working data and some amount (or all) of the most recent snapshots are maintained in two different non-volatile memory locations, enabling fast and reliable recovery after the power disruption event.

Moreover, to the extent to which user access of the application results in a request for previously utilized data not currently resident in the working data set 208, the requested data may be supplied from the data logs 210. Thus, for example, to the extent that the user desires to rewind a section of video, the previously stored video frames may be stored in the data logs 210, allowing the data request to be satisfied locally (e.g., from the second tier 202) rather than requiring a repeated transfer of the requested data from the remote application or data server 106, 108 across the network 104.

The rate at which the data updates in the working data 208 are logged to the data logs 210 can vary based on a number of factors. In some embodiments, each time a data update is received, the update is logged to the data logs 210 so that the data logs provide a complete history of the data accesses. In other embodiments, data logs are formed as snapshots of the current data state on a periodic basis (e.g., every X hours/minutes/seconds, etc.). In this latter case, as desired, intervening journal structures can be maintained to represent and capture the differences between each successive pair of snapshots.

Figure 6:
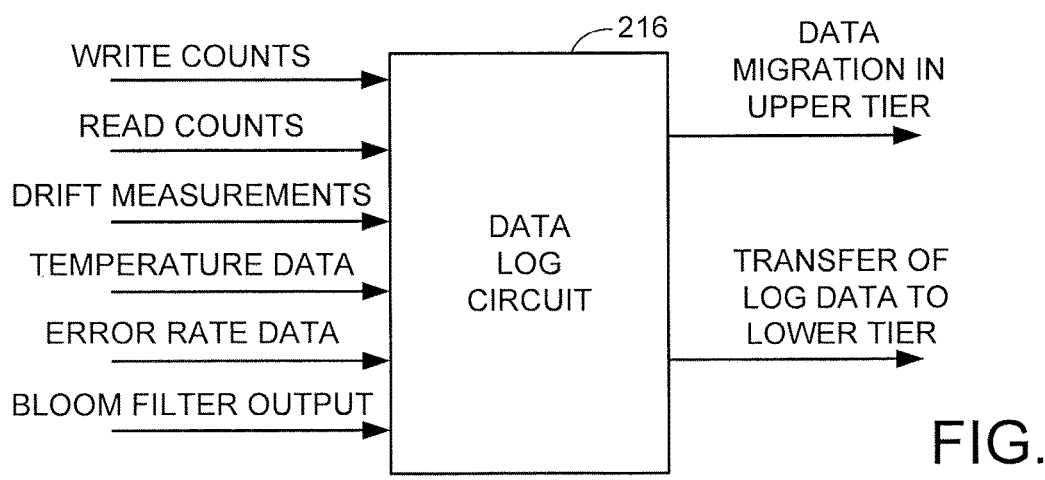
FIG. 6 shows a data log circuit operable in accordance with some embodiments.

In still other embodiments, the data updates are logged responsive to data migrations at the working data level. FIG. 6 depicts a data log circuit 216 adapted to carry out data migrations and transfers.

As noted above, the first tier 200 comprises rewritable memory cells with fast data I/O transfer rates and other characteristics suitable for use as a storage space for the working data 208. The use of rewritable memory cells allows data updates to be overwritten as desired onto older, previously existing data blocks without the need for an intervening erasure operation, which may slow down overall data I/O performance.

However, particularly in the case of highly interactive application environments where high frequency updates are experienced, various factors such as resistance drift, read/write disturb effects, and other parametric effects can cause a degradation of the data stored in the various rewritable memory cells.

Accordingly, the data log circuit 216 in FIG. 6 utilizes a variety of inputs, such as read/write counts, parametric drift measurements, temperature measurements, observed bit error rate (BER) data. These and other suitable parametric values and storage attributes can be combined into a weighted computation (bloom filter) empirically determined to correspond to a point in time when the stored data may begin to exhibit degradation.

Figure 7:
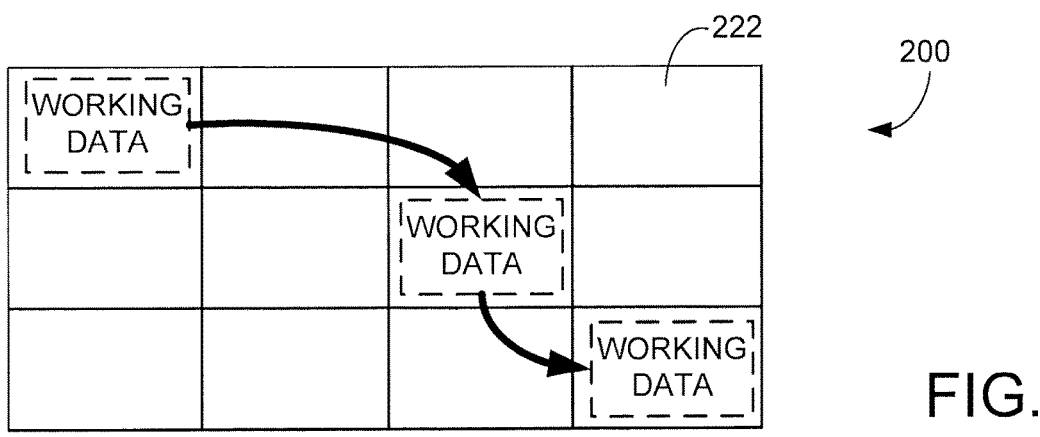
FIG. 7 depicts selected rotation of the working data in the first tier by the data log circuit of FIG. 6.

At such point, the working data are migrated to a new, different location within the first tier, and a copy of the working data are concurrently transferred as log data to the lower tier. In some embodiments, the upper tier 200 (or portion thereof) is managed as a plurality of garbage collection units (GCUs) 218, each of which are allocated and reset as a unit. As shown in FIG. 7, this allows the working data 208 to be periodically rotated through the first tier 200 as needed to ensure the data are maintained in an available state for data I/O requirements. It follows that the decision to migrate the working data in the upper tier 200 provides a convenient point to also log the data as a log update to the lower tier 202.

Figure 8:
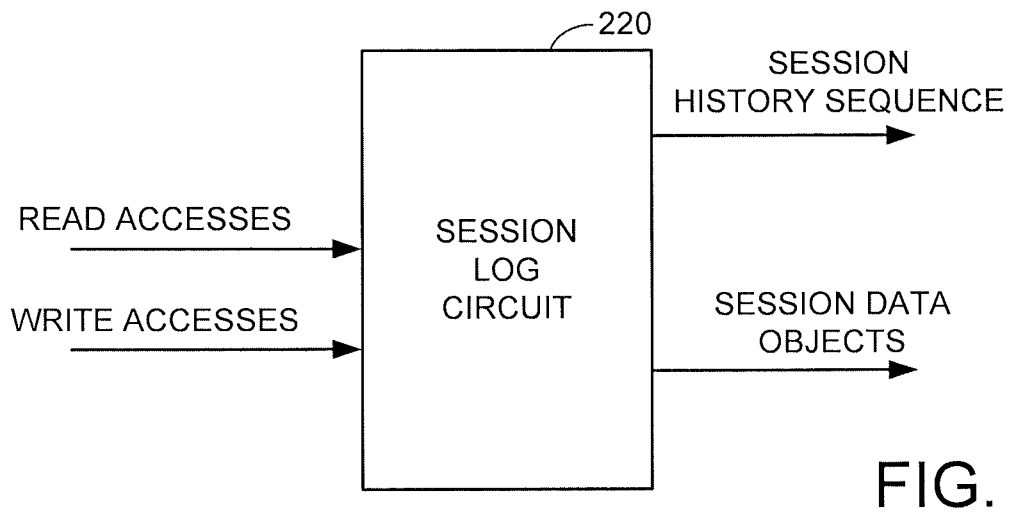
FIG. 8 shows a session log circuit operable to generate session history data and identify data objects of interest in accordance with some embodiments.

In addition to the data logs 212, the session log data 214 can be maintained as well. FIG. 8 shows a session log circuit 220 which may form a portion of the storage manager 140 or other aspect of the memory module 130. Unlike the data log circuit 216 which provides real time, or near real time representations of data changes via the data logs 212, the session log circuit 220 examines the sequence of read and write accesses that are carried out during each cloud computing session.

Each time new data are written to the first tier 200 as a part of the working data, the session log circuit 220 records the write operation using suitable metrics such as LBA, time/date, whether the write operation is an update to a previously stored LBA or is a newly presented LBA, the source of the written LBA (if known), etc. Similarly, each time data are read from the set of working data, the session log circuit 220 records the read operation using similar metrics. In this way, the session log circuit 220 can generate a session history sequence as a command history table (CHT) or similar data structure that spells out the sequence of access commands that were serviced during the session. In some embodiments, the elapsed time between successive commands may be included in the data structure. It will be noted that the CHT identifies the commands (e.g., write LBAs 1000-1020, read LBAs 3000-3002, etc.) and does not store the data objects themselves.

However, depending on the size of the working table, some or all of the data objects having a relatively high interest during the session may be identified and stored as part of the session data. Data objects with a high read rate, for example, may be identified as high interest data. Similarly, high priority data such as identifier data common to multiple sessions transferred from the device may be identified as a high interest session data.

Figure 9:
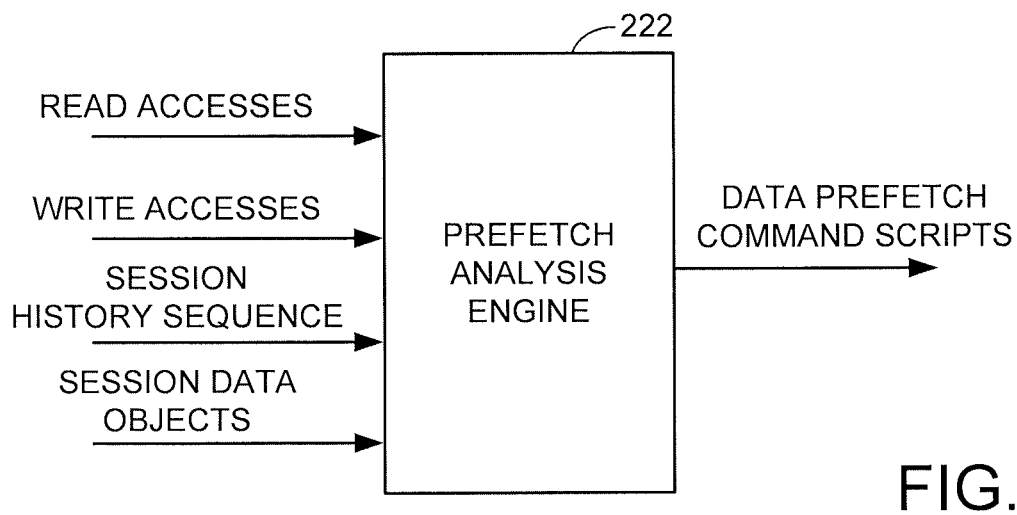
FIG. 9 shows a prefetch analysis engine operable to generate prefetch command scripts for subsequent sessions in accordance with some embodiments.

The session history sequence and session data objects from FIG. 8 can be used by a prefetch analysis engine 222 in FIG. 9 to analyze the various access patterns to form data prefetch command scripts. For example, receipt of a number of read and/or write accesses that closely match a previously captured session history sequence may cause the prefetch analysis engine to initiate one or more speculative prefetch commands to request additional data that may be required in the near future. The data requests may be issued directly by the memory module to another node in the system, such as directly to the remote servers 106, 108.

Alternatively, suitable application and/or driver software may be loaded to the user device 102 to enable the higher order processor 110 to initiate the data request across the network 104. In further embodiments, some of the higher interest session data identified and stored by the session log circuit 220 may also be prefetched and provided to the first tier 200 as a speculative data transfer. These and other types of inter-tier transfers can be managed by the storage manager 140.

Figure 10:
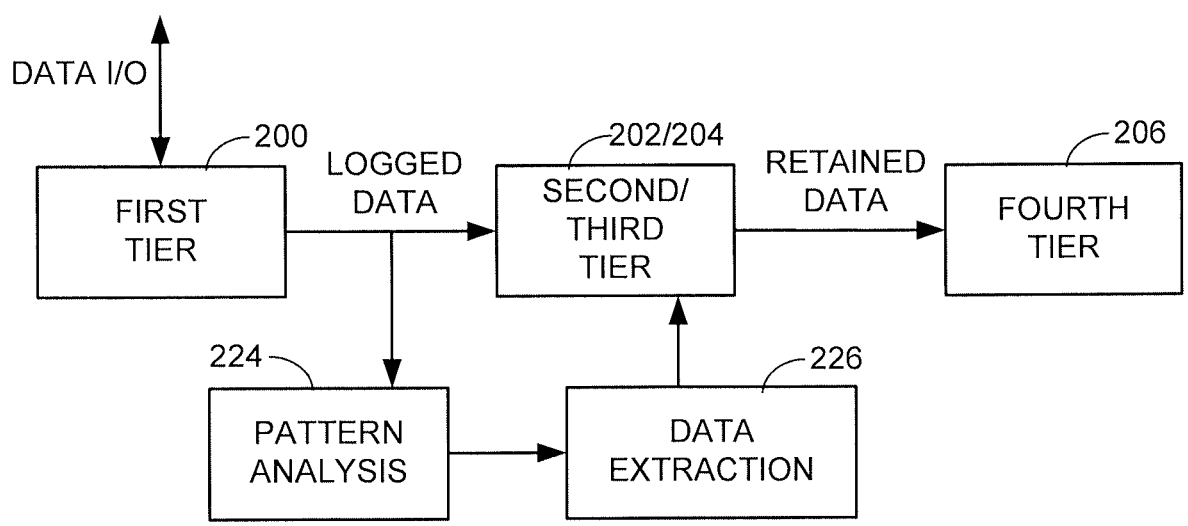
FIG. 10 depicts aspects of the prefetch analysis engine of FIG. 8.

FIG. 10 shows a sequence of operations that may be carried out by the prefetch analysis engine 222 of FIG. 9 in accordance with the foregoing discussion. During a selected session, the working data 208 from FIG. 5 will be resident in the first tier 200, and data I/O operations will be carried out to write data to and read data from the first tier 200. Logged data, such as the data logs 210 and/or the high interest session data of the session logs 212 are periodically transferred to a lower tier, such as the second and/or third tiers 202, 204. A pattern analysis block 224 analyzes the log data for patterns, and a data extraction block 226 identifies specific data objects that should be retained as retained data such as in the fourth memory tier 206.

In the case where the lower (fourth) tier represents relatively slower memory, such as flash memory, it will be appreciated that high interest data objects can be archived in the lower tier. Data compression can be used to reduce the footprint of the stored data. In the future when a data request is made for the retained data, local satisfying of the data from the fourth tier to the first tier will be much faster than requesting and recovering the requested data from the remote cloud network.

As required, the prefetch analysis engine 222 can monitor for updates to data blocks that are sent remotely for storage, and store such in the fourth tier (or other suitable lower tier location). It will be appreciated that any subsequent updates may obsolete an existing retained data set, so that the pendency of the retained data may depend on the extent to which updates are rendered by the user device. Nevertheless, caching a local copy of high interest data can reduce the need for data requests from the cloud network.

One issue that arises in the context of a cloud network is that the data are no longer all stored locally, but rather, some or all of the data will be stored remotely in the cloud. A problem may thus arise from the standpoint of, when a particular data set is needed, the user device (by way of the processor(s) 110) may automatically request the transfer of the data from the remote cloud resource server without consulting the local memory module 134 first. Accordingly, in some embodiments the interplay between the memory module and the local requestor is established such that the local requestor will determine whether the data are stored locally in the memory module 130 before issuing an unnecessary request for the data via the cloud network 104.

A map of the available data sets that have been retained by the memory module 134 can be provided to the processors (or other requestor) in charge of the node I/O communications so that requests for those blocks are not issued across the cloud without first having the blocks serviced locally.

In still other cases, the memory module 130 may be adapted to issue communications independently of the processors 110 and obtain requested data directly from a different node in the cloud network. An advantage is that the memory module 130 may be able to predict, either through current pattern analysis or previously session data structure analysis, that certain data blocks may be required in the near future, and so the memory module 130 can operate to prefetch the data, either locally (e.g., from the lower tier) or remotely (e.g., from the cloud). Suitable programming can resident on the memory module 130 to initiate and complete such transactions through the network I/O circuit 116 (FIG. 2).

FIG. 11 is a flow chart for a CLOUD NETWORK COMPUTING routine 250 generally illustrative of steps carried out in accordance with some embodiments. The routine of FIG. 11 is an overall routine representative of steps carried out each time a user device, such as the device 102, engages in a cloud-based transaction.

A session is initiated at 252 between the local device 102 and the cloud network 104. Data are requested from the cloud at step 254 for transfer to the local device 102. The data are received and stored in the local NV memory of the memory module 130 at step 256. Such data will constitute a portion of the working data 210 and will be stored in an upper tier 200.

Thereafter, normal data transfers are carried out at step 258. These may include requests for additional data from the cloud for storage on the memory module 130, read requests from the memory module 130 to output data for local use (e.g., display on the GUI 114, etc.) or storage remotely (e.g., on remote data server 108), or other data transactions. It will be appreciated that the various data log circuit, session log circuit and prefetch analysis engine of FIGS. 6-9 will operate in the background during this step.

The session then concludes at step 260 and suitable post-session processing is carried out at step 262 including the formation of one or more session history sequence tables, identification of session data objects (including retained copy of high interest data objects) and formation of data prefetch command scripts, all of which are stored in a lower tier of the memory module 130.

FIG. 12 depicts a DATA UPDATES AND LOGGING routine 270 that may be carried out in conjunction with the routine of FIG. 11. Input data constituting a portion of the working data 210 is initially stored to an upper, first tier such as the tier 200 in FIG. 5. Access operations are monitored at step 274, including frequency and types of reads/writes, storage attributes, etc. as discussed in FIG. 6. At step 276, periodic data logs, as copies of portions or all of the working data, are periodically transferred to a second lower tier, such as the tier 202 from FIG. 5. As desired, the working data are migrated to a new location to further address wear and endurance issues, as indicated at step 278.

FIG. 13 depicts a DATA PREFETCHING routine 280 that may also be carried out in conjunction with the routine of FIG. 11. A session is detected at step 282. This may include detecting initial data I/O requests as well as matching a sequence of such requests to one or more stored command history table structures for other, previously encountered sessions.

At step 284, a determination is made to see if one or more prefetch scripts were formed from the previous sessions. If so, retained data that may be requested in the near future are migrated locally from a lower tier (such as the fourth tier 206, FIG. 5) to a higher tier (such as the first tier 200, FIG. 5), step 286, and prefetched remotely through the cloud, step 288.

By storing and updating data sent across a network cloud environment to local non-volatile memory cells, data updates can be logged which can help to facilitate data integrity in the event of power loss (either local power via supply 120 or interconnection to the network 104). Moreover, the pre-fetching of data, either locally or remotely over the cloud network, can improve initialization and operation response times.

As discussed above, in some embodiments a cloud network is provided with a plurality of nodes, with at least one of the nodes having a tiered non-volatile memory. The memory stores data transfers and updates, and supports both real time data integrity and faster data transfer. At least one of the nodes can be multiple nodes that are tiered with more than one type of memory for hierarchical loggin, transfer and long term storage. The predictive pre-fetching of data can correspond to tracked patterns of data accesses and updates.

Numerous characteristics and advantages of various embodiments of the present disclosure have been set forth in the foregoing description, together with structural and functional details. Nevertheless, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
receiving data updates to a multi-tier memory structure of a local user device across a cloud network from a remote server during a cloud computing session and storing the received data updates as working data in a first location of an upper memory tier of the memory structure;
predicting degradation in the first location of the upper memory tier with a data log circuit;
migrating a current version of the working data to a different, second location in the upper memory tier responsive to predict degradation in the first location;
logging the current version of the working data to a lower memory tier in the memory structure of the local user device as at least one snapshot responsive to the migration of the current version of the working data to the different, second location in the upper memory tier, the upper and lower memory tiers each comprising rewritable non-volatile memory cells having different constructions and storage attributes;
generating a request for a selected data update from the remote server;
analyzing a sequence of access operations upon the working data and initiating a prefetch command script to speculatively request selected data in anticipation of a future request for said selected data in which the request for the selected data is issued to the lower memory tier of the multi-tier memory structure and the selected data are transferred from the lower memory tier to the upper memory tier of the multi-tier memory structure; and
transferring the selected data update from the lower memory tier to the upper memory tier in lieu of issuing the request to the remote server.

2. The method of claim 1, further comprising resetting all of the rewritable non-volatile memory cells at the first location to a known programming state responsive to the migration of the current version of the working data to the different, second location in the upper memory tier.

3. The method of claim 1, further comprising detecting a temporary disruption event that interrupts the cloud computing session, and transferring the working data logged in the lower memory tier to the upper memory tier responsive to the detection of the temporary disruption event.

4. The method of claim 1, wherein the cloud computing session is a first cloud computing session, and the method further comprises generating a session log comprising a sequential list of access operations that were executed upon the working data during the first cloud computing session, storing the session log in the lower memory tier of the memory structure, and using the session log to detect a subsequent, second cloud computing session matching a portion of the first cloud computing session and to prefetch data updates from the remote server to the upper memory tier of the memory structure identified by the session log.

5. The method of claim 4, in which the session log comprises a command history table that identifies read and write operations executed during the cloud computing session in sequential order and an elapsed time interval between each pair of successive commands.

6. The method of claim 1, wherein the data log circuit comprises a bloom filter to detect the degradation of the first location responsive to at least a selected one of a parametric drift measurement, a temperature measurement, or an observed bit error rate (BER).

7. The method of claim 1, in which the request for the selected data is issued to the remote server and the selected data are transferred across the cloud network to the upper memory tier from the remote server.

8. An apparatus comprising:
a multi-tier memory structure in a local user device comprising a plurality of non-volatile memory tiers each having different data transfer attributes and corresponding rewritable memory cell constructions and storage attributes;
a data log circuit configured to predict degradation in a first location of an upper non-volatile memory tier of the multi-tier memory structure and migrate a current version of working data to a different, second location in the upper non-volatile memory tier responsive to the predicted degradation in the first location; and
a storage manager circuit adapted to generate a session log comprising a sequential list of access operations carried out during a first cloud computing session between the local user device and a remote server across a cloud network, to store data updates received by the local user device during the first cloud computing session as working data in the upper non-volatile memory tier, to log the working data to a lower non-volatile memory tier in the multi-tier memory structure of the local user device while maintaining a most current version of the working data in the upper non-volatile memory tier to transfer selected working data logged in the lower non-volatile memory tier to the upper non-volatile memory tier in lieu of issuing a request for the selected working data from the remote server, to store the session log in the lower non-volatile memory tier at a conclusion of the first cloud computing session, to use the session log to detect a subsequent, second cloud computing session matching a portion of the first cloud computing session, to analyze a sequence of access operations upon the working data and initiate a prefetch command script to speculatively request selected data in anticipation of a future request for said selected data in which the request for the selected data is issued to the lower memory tier of the multi-tier memory structure and the selected data are transferred from the lower non-volatile memory tier to the upper non-volatile memory of the multi-tier memory structure, and to prefetch selected data updates from the lower non-volatile memory tier to the upper non-volatile memory tier identified by the session log prior to a request for the selected data updates during the second cloud computing session.

9. The apparatus of claim 8, in which the storage manager circuit comprises a data log circuit that logs the working data to the lower non-volatile memory tier and concurrently performs a garbage collection operation to migrate the working data from a first location to a second location in the upper non-volatile memory tier and reset rewritable memory cells at the first location to a known programming state, wherein the storage manager circuit logs the working data to the lower non-volatile memory tier responsive to the garbage collection operation.

10. The apparatus of claim 9, in which the logged working data stored in the lower non-volatile memory tier comprise snapshots of the working data stored in the upper non-volatile memory tier, wherein the snapshots are logged as a part of the garbage collection operation.

11. The apparatus of claim 8, in which the session log comprises a command history table that identifies read and write operations executed during the first cloud computing session in sequential order and an elapsed time interval between each pair of successive commands.

12. The apparatus of claim 11, in which the session log further comprises at least one copy of a data block from the working data identified as having high level of interest, wherein the at least one copy of the data block is stored as retained data in the lower memory tier.

13. The apparatus of claim 8, in which the storage manager comprises a data pattern analysis engine adapted to analyze the sequential list of access operations upon the working data and initiate a prefetch command script to speculatively request selected data in anticipation of a future request for said selected data.

14. The apparatus of claim 8, in which the upper non-volatile memory tier comprises a selected one of STRAM, PCRAM or RRAM rewritable non-volatile memory cells, and the lower non-volatile memory tier comprises a different selected one of STRAM, PCRAM or RRAM rewritable non-volatile memory cells.

15. The apparatus of claim 8, further comprising a programmable processor having associated programming in memory which, when executed by the programmable processor, operates to establish a first cloud computing session between the storage device and a remote server across a cloud network, to generate a session log of access operations carried out during the first cloud computing session to transfer data objects between the remote server and the first non-volatile memory tier, to store a duplicate copy of at least one data object from the first non-volatile memory tier to the second non-volatile memory tier, to perform post-session processing at a conclusion of the first cloud computing session by forming at least one data prefetch command script that describes the session log at a conclusion of the first cloud computing session, the at least one prefetch command script corresponding with an initiated speculative request of selected data in anticipation of a future request for said selected data resulting from analysis of a sequence of access operations upon the logged session operations, to issue the speculative request for the selected data to the first non-volatile memory tier, and to store the at least one data prefetch command script in the second non-volatile memory tier while maintaining the duplicate copy of the at least one data object therein, the programmable processor adapted to migrate the selected data and a current version of the working data to a different, second location in the first non-volatile memory tier responsive to predicted degradation in the first location.

16. The apparatus of claim 15, wherein the programming when executed by the programmable processor further operates to compress the duplicate copy of the at least one data object in the second non-volatile memory tier.

17. The apparatus of claim 15, wherein the programming when executed by the programmable processor further operates to relocate a selected data object from a first location to a second location in the first memory tier during the first cloud computing session responsive to a detected degradation of the selected data object in the first location, and to concurrently store a copy of the selected data object in the second memory tier in response to the relocation of the data object from the first location to the second location.

18. The apparatus of claim 15, wherein the programming when executed by the programmable processor further operates to establish a subsequent, second cloud computing session between the storage device and the remote server across the network, to generate a second session log of access operations carried out during the second cloud computing session to transfer data objects between the remote server and the first non-volatile memory tier, to compare the at least one data prefetch command script in the second non-volatile memory tier to the second session log, and to migrate the duplicate copy of the at least one data object stored in the second memory tier during the first cloud computing session to the first memory tier responsive to the comparison of the at least one data prefetch command script to the second session log.

* * * * *